United States Patent [19]

Kuster et al.

[11] Patent Number: 5,779,755
[45] Date of Patent: Jul. 14, 1998

[54] DEVICE FOR TEMPERING A GLASS SHEET BY CONTACT

[75] Inventors: Hans-Werner Kuster, Aachen; Carsten Bremer, Baesweiler, both of Germany

[73] Assignee: Saint Gobain Vitrage, Courbevoie, France

[21] Appl. No.: 386,666

[22] Filed: Feb. 10, 1995

[30] Foreign Application Priority Data

Feb. 10, 1994 [DE] Germany .................. 44 04 165.9

[51] Int. Cl.[6] .................................................. C03B 27/004
[52] U.S. Cl. .................. 65/348; 65/351; 65/355; 65/356; 65/114
[58] Field of Search ................ 65/348, 351, 374.12, 65/114, 115, 104, 268, 273, 103, 194, 288, 275, 287, 355, 356

[56] References Cited

U.S. PATENT DOCUMENTS

| | | | |
|---|---|---|---|
| 2,042,610 | 6/1936 | Littleton | 65/348 |
| 2,178,520 | 10/1939 | Howard | 65/351 |
| 3,455,670 | 7/1969 | McMaster | 65/351 |
| 3,469,963 | 9/1969 | Beattie | 65/351 |
| 3,595,636 | 7/1971 | Posney | 65/275 |
| 3,600,150 | 8/1971 | Rougeux | 65/275 |
| 3,694,182 | 9/1972 | Akfirat et al. | 65/348 |
| 3,776,712 | 12/1973 | Wilde | 65/351 |
| 3,819,351 | 6/1974 | Shaffer et al. | 65/275 |
| 3,960,535 | 6/1976 | Hamilton et al. | 65/273 |
| 4,198,463 | 4/1980 | Greenhalgh | 65/115 |
| 4,319,907 | 3/1982 | Pike | 65/106 |
| 4,714,489 | 12/1987 | Bennett et al. | 65/115 |
| 4,826,522 | 5/1989 | D'Iribarne et al. | 65/115 |
| 4,906,271 | 3/1990 | D'Iribarne et al. | 65/374.12 |
| 5,021,075 | 6/1991 | Vanaschen et al. | 65/351 |
| 5,139,552 | 8/1992 | Yoshizawa et al. | 65/348 |
| 5,183,491 | 2/1993 | D'Iribarne et al. | 65/351 |
| 5,330,550 | 7/1994 | Kuster et al. | |
| 5,352,263 | 10/1994 | Kuster et al. | |
| 5,441,551 | 8/1995 | Ollfisch et al. | 65/162 |

*Primary Examiner*—Steven P. Griffin
*Attorney, Agent, or Firm*—Oblon, Spivak, McClelland, Maier & Neustadt, P.C.

[57] ABSTRACT

For tempering by contact of a glass sheet having a through hole, cooled clamping pieces coated with thermoresistant fibers having a high thermal conductivity act on the surfaces of the glass sheet heated to the tempering temperature. During the action of the clamping plates, the inner surfaces of the glass sheet defining the hole are struck by a cooling gas. The cooling gas is injected by a jet or nozzle tube located in a clamping plate within a bore, which passes coaxially through the air-permeable covering fabric and, after having been whirled up within the hole, escapes through the fabric via a backflow pipe surrounding the jet or nozzle tube.

11 Claims, 3 Drawing Sheets

DEVICE FOR TEMPERING A GLASS SHEET BY CONTACT

BACKGROUND OF THE INVENTION

Field of the Invention

The invention relates to a device for contact tempering or prestressing of glass sheets and in particular car windows, in which cooled clamping plates act on the surfaces of the glass sheets heated to the tempering temperature.

A process for a device of this type is, e.g., known from European patent EP 404,677 B1. This process consists of bringing the glass sheet heated to the tempering temperature into a type of press in which the glass sheet is suddenly cooled and therefore tempered, at the same time as the peripheral surfaces of the glass sheet are cooled by cooling air streams perpendicular to the peripheral surfaces and are consequently also exposed to prestressing by pressure.

The windows of cars often have one or more through holes. This is, e.g., the case with movable side windows where a locking mechanism and/or guide pins have to be fixed to the glass sheet. Sometimes the rear windows also have a perforation through which is passed the pivot of a windscreen wiper rod.

As is known, the holes of the glass sheet must be made prior to its tempering, because a tempered glass sheet would be broken by the perforation. It has been found that by tempering glass sheets in cold air, even those sheets provided with perforations have a high bending strength, whereas perforated sheets tempered by contact have a lower bending strength.

SUMMARY OF THE INVENTION

It is an object of the invention to provide a device capable of contact tempering perforated sheets in such a way that they have a bending strength corresponding to that of conventional air tempering.

According to the invention, in glass sheets having one or more through holes, a cooling gas is projected onto the inner surfaces defining the perforations of the glass sheets during the pressing by the clamping plates. More particularly, in the process according to the invention, in the known contact tempering process for glass sheets having one or more through holes, the walls of the holes are also subject to a selective surface cooling by convection. Thus, both convective and contact tempering are applied on the surface of the holes prestressing by pressure, which leads to the desired increase in the bending strength. A glass sheet tempered according to the invention consequently has a uniformity of surface stresses resulting, so that a polarized light image of said sheet has a neutral line concentric to the periphery of the hole characteristic of the compression stresses obtained at the edge of the hole.

In a first embodiment of a contact tempering device suitable for applying the process according to the invention with two clamping plates, at the location of the clamping plates covering a perforation of the glass sheet, one of the clamping plates has one or more inflow openings or nozzles for a cooling gas, whereas the other clamping plate has one or more backflow openings at the corresponding location. This embodiment is particularly suitable for contact tempering presses, whereof the two clamping plates are solid metal plates traversed by cooling air ducts.

In another embodiment of a device according to the invention, only one of the two clamping plates is provided with one or more inflow openings for a cooling gas, as well as one or more backflow openings, both the inflow openings and the backflow openings being adjacent to the interior of the location of the plate covering a perforation of the glass sheet. This embodiment is particularly suitable for contact tempering presses where one of the clamping plates is of solid metal, the other having a water-filled, hollow space of at least the size of the glass sheet, said space being sealed by an impermeable, flexible diaphragm on the contact side with the glass sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
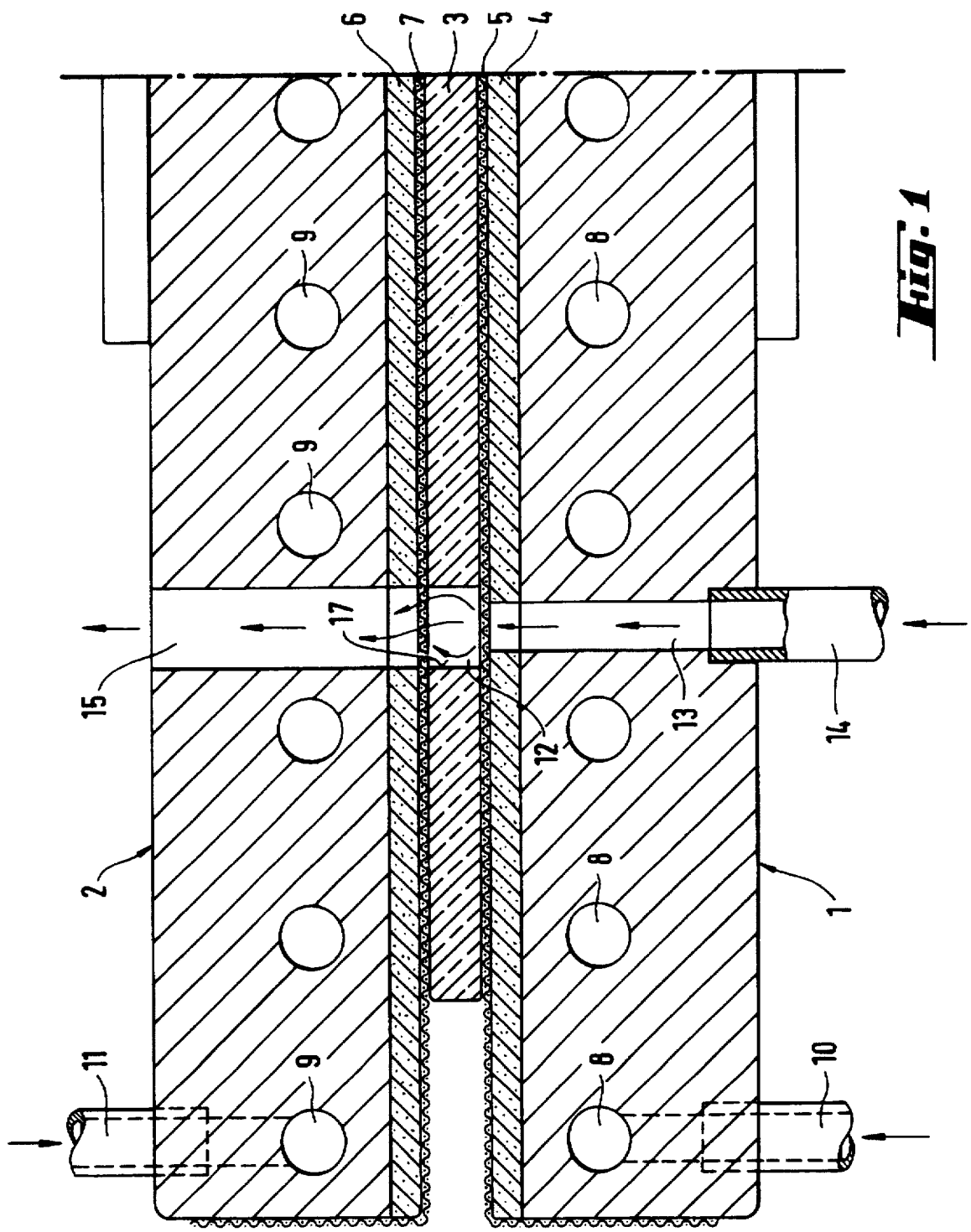
FIG. 1 shows a first embodiment of a tempering device according to the invention.

The contact tempering device shown in FIG. 1 has a lower clamping plate 1 and an upper clamping plate 2, between which is located a glass sheet 3. The lower clamping plate is provided with two elastic layers 4 and 5 having a high thermal conductivity, the layer 4 being, e.g., a lamellar graphite plate and the superimposed layer 5 being a metal fiber fabric. The elementary fibers forming the said fabric or wire gauze preferably have a diameter smaller than 50 micrometers. In the same way, the upper clamping plate is provided with similar elastic layers 6 and 7. The two clamping plates 1 and 2 are provided with pipes 8 and 9 through which passes the cooling water. The supply of cooling water takes place through the pipes 10 and 11. The cooling water is discharged by (not shown) piping.

The lower clamping plate 1, including the layer 4, is provided with a bore 13 to which is attached a tube 14, connected to a compressed air pipe. In the same way, the upper clamping plate 2, including the layer 6, has a through bore 15 substantially coaxial with the bore 13, via which the blown in air escapes.

The metal fiber fabrics or gauzes 5 and 7 are not interrupted at the location of the bores 13 and 15 and instead extend over their orifices. In order to ensure an adequate air permeability at this location, it is necessary to use at 5 and 7 fabrics or meshes having a porosity of at least 60% and preferably at least 80%. The fabrics and meshes used for this purpose are, e.g., described in European patents 312,439 B1 and 387,111 B1.

The orifices of the bores 13 and 15 are located within the plates at positions corresponding to the holes of the glass sheets 3. In the case shown here, the bores 13 and 15 are both perpendicular to the glass sheet surface. In this arrangement, the cooling gas passing out of the bore 13 first flows through the perforation 12 of the glass sheet 3, thereby cooling the lower surfaces defining the perforation 12 and then passes into the atmosphere through the bore 15.

This device makes it possible to implement the process of the invention in the following way. The upper clamping plate is raised. The glass sheet, raised to its tempering temperature, is brought between the liquid-cooled clamping plates 1 and 2 and the clamping plate 2 is pressed onto the glass sheet 3. During the action of the cooling plates 1 and 2 on the glass sheet 3, a valve located in the tube 14 is open and the cooling gas is blown through it into the perforation 12. The cooling gas then flows out through the bore 15.

Figure 2:
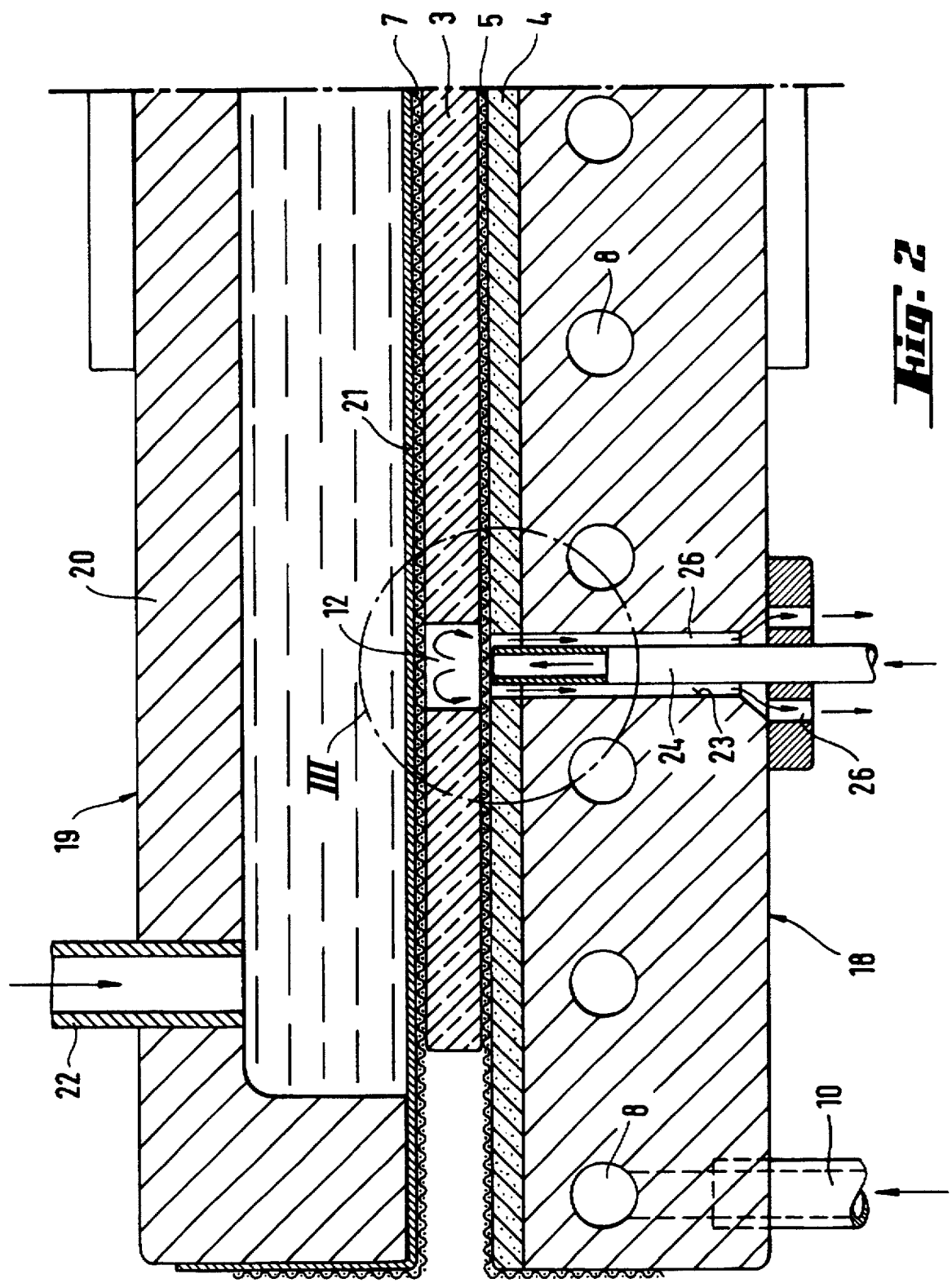
FIG. 2 shows a second embodiment of a tempering device according to the invention.

The prestressing device shown in FIG. 2 also has a lower clamping plate 18 and an upper clamping plate 19 between which is located a glass plate 3. As in the previous embodiment, the lower clamping plate 18 is provided with two elastic layers 4 and 5 with a high thermal conductivity. The upper clamping plate is constituted by a metal box 20 sealed at the bottom by a flexible diaphragm 21 and filled with cooling water. The cooling water is supplied by a tube 22 and flows out through another (not shown) tube. The regulation of the water supply and/or its discharge makes it possible to regulate the pressure and outflow speed of the water within the metal case 20.

At the location of the perforation 12 of the glass sheet, the lower clamping plate 18 is provided with a bore 23 within which a jet tube 24 is positioned coaxially to and concentrically within the bore 23 and oriented toward the glass sheet and which terminates just below the fabric layer 5. Between the outer wall of the jet tube 24 and the wall of the bore 23 there is defined a hollow space having an annular section and serving as a discharge pipe 26 for the cooling air supplied by the tube 24, which is connected to an appropriate compressed air supply.

In order to perform the process according to the invention, the glass sheet is placed between the clamping plates, as in the preceding embodiment, and pressing is performed. During the action of the cooling plates 18, 19 on the glass sheet 3, the wall of the perforation 12 of the glass sheet receives a cooling gas. In order to obtain an adequate cooling gas flow and a high cooling rate, use is preferably made of air at an overpressure of 100 to 500 Pa as the cooling agent. After cooling the wall of the perforation 12, and so being heated, the cooling gas descends through the outflow pipe 26. If desirable for any reason, it is possible to increase the cooling gas flow by increasing its overpressure and/or selectively pumping the air out (e.g., sucking out the discharge air) by means of a (not shown) pumping system.

The arrangement both of the inflow pipe and the backflow pipe of the lower clamping plate 18 makes it unnecessary to modify the upper clamping plate 19. This is extremely useful when the upper clamping plate is provided with a flexible diaphragm, because it permits the integral retention of the flexibility of the diaphragm and therefore its capacity to be regularly applied to the glass sheet.

The device shown in FIG. 2 is also very advantageous because it is only necessary to carry out the modifications required for performing the invention on one of the two clamping plates. The modifications to be made, i.e., the making of a bore in the lower clamping plate, may even be made on an existing contact tempering device. Consequently, when only one or more supplementary holes are made in the glass sheets without modifying the shape thereof or when a hole is made at a different location as compared with the previous situation, it is not necessary to make a complete new plate.

Figure 3:
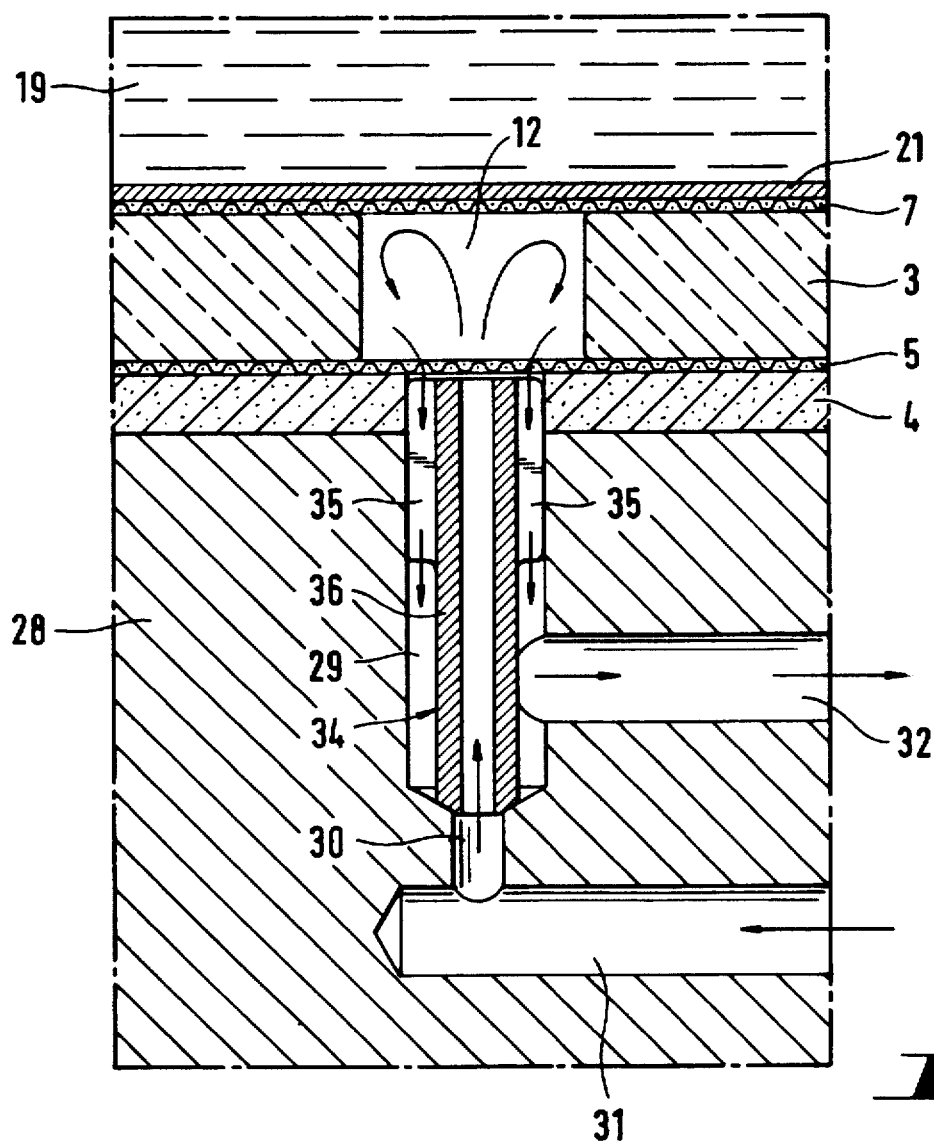
FIG. 3 shows another arrangement of the inflow ducts of the device according to FIG. 2.
Figure 4:
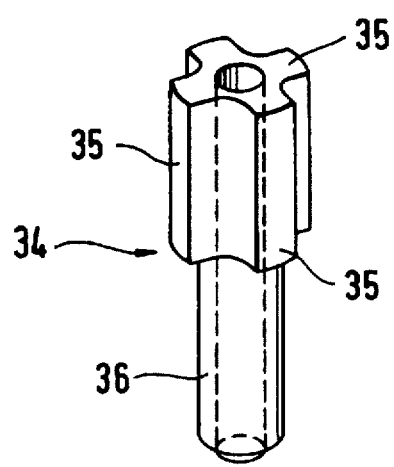
FIG. 4 shows a detail of FIG. 3.

As has already been stated, the selective pumping of the gas which escapes through the discharge pipe may be advantageous. A construction form particularly suitable for this purpose is shown in FIG. 3, which corresponds to section III of FIG. 2. Otherwise the construction of the two clamping plates 18, 19, including the elastic layer 4 and the fabric layer 5 above it in the clamping plate 18, together with the diaphragm 21 and the fabric layer 7 of the upper clamping plate 19, correspond to the device described relative to FIG. 2.

In this case, a blind hole 29 is made in the metal body 28 of the clamping plate 18. Coaxially to said blind hole 29 is connected a smaller diameter bore 30 which issues into a perpendicular bore 31, which also serves as a cooling air inflow channel. On the other hand, a bore 32 is made perpendicularly to the blind hole 29, issues into the same and serves as a cooling air outflow channel. In the blind hole 29 is inserted concentrically thereto an essentially tubular part 34, whose top has radially projecting ribs 35 which support it against the wall of the bore 29. The bottom of the lower tubular portion 36 of said inserted part 34 seals against the bottom of the blind hole 29 so that the passage of the tubular part forms an extension of the bore 30 for delivering cooling air to the perforation 12. The passages remaining between the ribs 35 permit communication between the perforation 12 and the outflow pipe 32.

Even in this case, it is important that the fabric or meshes 5 is not interrupted at the opening of the bore 29 and also that it has an adequate porosity to enable the cooling air to pass in sufficient quantity through the fabric or meshes.

In the preceding embodiments, the cooling air was supplied on each occasion in the center of the perforation of the glass sheet and discharged close to the wall thereof. However, it is possible to proceed in the reverse order, i.e., reverse the inflow and backflow pipes and thus make the cooling air penetrate the perforation of the glass sheet close to its wall by sucking air in through a central pipe. It is also possible to give a different configuration to the backflow openings should this prove useful.

It is common to all these embodiments that, unlike in the known tempering methods, the cooling air is not oriented perpendicular to the surfaces to be prestressed, but instead in the axial direction of the hole, i.e., parallel to the walls to be suddenly cooled. Surprisingly it has been found that this leads to a perfectly adequate cooling speed for the walls of the holes, at least at the location of the latter. The particular advantage of this process is that it is possible to obtain a prestressing of the wall of the holes using relatively simple means.

Obviously, numerous modifications and variations of the present invention are possible in light of the above teachings. It is therefore to be understood that the invention may be practiced otherwise than as specifically described herein.

What is claimed as new and is desired to be secured by Letters Patent of the United States is:

1. Device for tempering by contact a glass sheet having at least one hole, comprising:

two cooled clamping plates for holding said glass sheet having said at least one hole therebetween; and a cooling gas inflow opening in one of said two clamping plates at a location corresponding to said at least one hole, when the glass sheet is held between said plates, for applying a cooling gas to a wall of said at least one hole; and a cooling gas outflow opening in the other of said two clamping plates at a location corresponding to said at least one hole when the glass sheet is held between said plates, and substantially coaxial with said cooling gas inflow opening, for discharging the cooling gas therefrom.

2. Device according to claim 1 including air-permeable fabric formed from high thermal conductivity, heat-resisting fibers covering surfaces of said clamping plates intended to contact the glass sheet, the fabric uninterruptedly covering the cooling gas inflow and outflow openings of the clamping plates.

3. Device according to claim 2 wherein said fabric is formed from metal fibers and has a porosity of at least 60%.

4. Device according to claim 2 wherein said fabric is formed from metal fibers and has a porosity of at least 80%.

5. Device for tempering by contact a glass sheet having at least one hole, comprising:

two cooled clamping plates for holding said glass sheet having said at least one hole therebetween; and a cooling gas inflow opening in one of said two clamping plates at a location corresponding to said at least one hole, when the glass sheet is held between said plates, for applying a cooling gas to a wall of said at least one hole; and a cooling gas outflow opening in said one of said two clamping plates at a location adjacent said cooling gas inflow opening and corresponding to said at least one hole when the glass sheet is held between said plates, and substantially coaxial with said cooling gas inflow opening, for discharging the cooling gas therefrom.

6. Device according to claim 5, wherein said cooling gas outflow opening comprises a bore in said one of said clamping plates, and said cooling gas inflow opening comprises a jet tube oriented toward the glass sheet, in said bore.

7. Device according to claim 6 wherein said jet tube is positioned concentrically within said bore.

8. Device according to claim 6, wherein the jet tube is oriented to apply said cooling gas to said wall of said at least one hole in an axial direction of said at least one hole parallel to said wall of said at least one hole.

9. Device according to claim 5 including air-permeable fabric formed from high thermal conductivity, heat-resisting fibers covering surfaces of said clamping plates intended to contact the glass sheet, the fabric uninterruptedly covering the cooling gas inflow and outflow openings of the clamping plates.

10. Device according to claim 9 wherein said fabric is formed from metal fibers and has a porosity of at least 60%.

11. Device according to claim 9 wherein said fabric is formed from metal fibers and has a porosity of at least 80%.

* * * * *